US010122245B2

(12) United States Patent
Koyama et al.

(10) Patent No.: US 10,122,245 B2
(45) Date of Patent: Nov. 6, 2018

(54) ENGINE-DRIVEN WORKING MACHINE (71) Applicant: HONDA MOTOR CO., LTD., Tokyo (JP)

(72) Inventors: Hiroshi Koyama, Wako (JP); Masashi Kai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/454,482

(22) Filed: Mar. 9, 2017

(65) Prior Publication Data

US 2017/0271953 A1    Sep. 21, 2017

(30) Foreign Application Priority Data

Mar. 15, 2016    (JP) .................. 2016-051635

(51) Int. Cl.
| | |
|---|---|
| *F01P 1/06* | (2006.01) |
| *H02K 9/06* | (2006.01) |
| *F01P 5/04* | (2006.01) |
| *H02K 7/18* | (2006.01) |
| *H02K 11/00* | (2016.01) |

(Continued)

(52) U.S. Cl.
CPC ............... *H02K 9/06* (2013.01); *F01P 1/06* (2013.01); *F01P 5/04* (2013.01); *F02B 63/04* (2013.01); *H02K 7/1815* (2013.01); *H02K 11/0094* (2013.01); *F01P 1/02* (2013.01); *F01P 2001/005* (2013.01); *F02B 63/048* (2013.01)

(58) Field of Classification Search
CPC ...... F02B 63/04; F02B 63/048; F02B 63/044; F01P 1/06; F01P 5/06
See application file for complete search history.

(56) References Cited

U.S. PATENT DOCUMENTS

| | | | |
|---|---|---|---|
| 6,378,468 B1 * | 4/2002 | Kouchi ............... | F02B 63/04 123/195 C |
| 6,378,469 B1 * | 4/2002 | Hiranuma ............ | F02B 63/04 123/195 C |

(Continued)

FOREIGN PATENT DOCUMENTS

| | | |
|---|---|---|
| EP | 1069293 A2 | 1/2001 |
| JP | H11-200876 A | 7/1999 |

(Continued)

OTHER PUBLICATIONS

European Search Report dated Jul. 18, 2017, 6 pages.
European Office Action dated Jun. 12, 2018, 4 pages.

*Primary Examiner* — Long T Tran
(74) *Attorney, Agent, or Firm* — Rankin, Hill & Clark LLP (57) ABSTRACT

An engine-driven working machine capable of reducing an opening of an outer case to be small, and decreasing the number of components is provided. An engine-driven working machine 10 is a generator in which an inverter 27 is provided at a suction side of a cooling fan 17, and a fuel tank 25 is provided over the inverter 27. The generator 10 includes an intake port 36 that is formed in an outer case 12, and a first air guide passage 61 that is formed by a tank bottom portion 38 of the fuel tank 25. The intake port 36 is formed in a lower side part 12*b* of a tank front wall 37, in the outer case 12. The first air guide passage 61 is formed by the tank bottom portion 38 that is inclined with a falling gradient toward the inverter 27 from the intake port 36.

4 Claims, 5 Drawing Sheets

(51) Int. Cl.
*F02B 63/04* (2006.01)
*F01P 1/02* (2006.01)
*F01P 1/00* (2006.01)

(56) References Cited

U.S. PATENT DOCUMENTS

2009/0320773 A1* 12/2009 Kobayashi ................ F01P 1/02
 123/41.31
2010/0037837 A1 2/2010 Yamasaki et al.

FOREIGN PATENT DOCUMENTS

JP 2001-027125 A 1/2001
WO 2008/032414 3/2008

* cited by examiner

ENGINE-DRIVEN WORKING MACHINE

INCORPORATION BY REFERENCE

The present application claims priority under 35 U.S.C. § 119 to Japanese Patent Application No. 2016-051635 filed on Mar. 15, 2016. The content of the application is incorporated herein by reference in its entirety.

BACKGROUND OF THE INVENTION

Field of the Invention

The present invention relates to an engine-driven working machine in which a cooling fan and an inverter are provided in an inside of an outer case.

Description of the Related Art

As an engine-driven working machine, there is known a generator in which a first intake port and a second intake port are formed in an outer case, an inverter is cooled with cooling air that is guided from the first intake port, and a fuel tank is cooled with cooling air that is guided from the second intake port (Refer to International Publication No. WO 2008/032414, for example).

However, when the first intake port that cools the inverter, and the second intake port that cools the fuel tank are respectively formed individually, an opening of the outer case becomes large, which is not preferable from the viewpoint of suppressing noise.

As the means for suppressing noise, reducing the opening of the outer case to be small is conceivable. However, when the opening of the outer case is reduced to be small, an exclusive shroud is required, which efficiently guides the cooling air taken in from the opening to the inverter and the fuel tank.

This becomes a hindrance to decreasing the number of components, and there is a room for improvement from this point of view.

SUMMARY OF THE INVENTION

The present invention addresses a problem to provide an engine-driven working machine that is capable of reducing an opening of an outer case to be small, and degreasing the number of components.

A first aspect of the present invention provides an engine-driven working machine in which a cooling fan is provided in an inside of an outer case, an inverter is provided at a suction side of the cooling fan, and a fuel tank is provided over the inverter, including an intake port that is formed in a lower side part of a wall portion of the fuel tank, in the outer case, and an air guide passage that is formed by a bottom portion, the bottom portion of the fuel tank inclining with a falling gradient toward the inverter from the intake port.

As above, the intake port is formed in the outer case, and the intake port is disposed at the lower side part of the wall portion of the fuel tank. Further, the bottom portion of the fuel tank is inclined with a falling gradient toward the inverter from the intake port, and the air guide passage is formed by the bottom portion.

Consequently, the outside air that is sucked from the intake port can be guided to the air guide passage as cooling air, and the cooling air that is guided can be efficiently guided toward the inverter with the air guide passage.

Thereby, the fuel tank can be favorably cooled with the cooling air that is guided to the air guide passage. Furthermore, the cooling air that is guided is efficiently guided to the inverter with the air guide passage, and thereby, the inverter can be favorably cooled. That is, by forming the single intake port, both members of the fuel tank and inverter can be cooled. Thereby, the opening in the outer case can be reduced to be small, and noise of the engine-driven working machine can be reduced.

Furthermore, by forming the air guide passage by the bottom portion of the fuel tank, there is no need to form the air guide passage by an exclusive member (that is, a shroud), and the number of components can be decreased.

In a second aspect of the present invention, the fuel tank preferably has a bend portion that is provided at the bottom portion of the fuel tank to form a part of the air guide passage, and guides cooling air that is guided to the air guide passage toward the inverter.

As above, the bend portion is formed in the bottom portion of the fuel tank, and cooling air is guided toward the inverter with the bend portion. Thereby, the cooling air can be more efficiently guided to the inverter and the inverter can be cooled more favorably, without the bend portion being formed by an exclusive member (that is, a shroud).

In a third aspect of the present invention, the engine-driven working machine preferably includes an operation section that is provided under the bottom portion, and a cover that covers equipment of the operation section, wherein a top portion of the cover is disposed in an inclined shape with a space left with respect to the bottom portion, and the air guide passage is formed by the bottom portion and the top portion.

As above, the equipment of the operation section is covered with the cover, and the top portion of the cover is disposed in an inclined shape with the space left with respect to the bottom portion of the fuel tank. Furthermore, the air guide passage is formed by the bottom portion and the top portion. As above, the air guide passage is formed by the bottom portion and the top portion, whereby the cooling air can be more efficiently caused to flow to the air guide passage, and further, the cooling air can be guided to the inverter more favorably.

Thereby, the fuel tank and the inverter can be cooled with the cooling air without using an exclusive member (that is, a shroud).

According to the present invention, the bottom portion of the fuel tank is inclined with a falling gradient toward the inverter from the intake port, and the air guide passage is formed by the bottom portion. Thereby, the opening of the outer case can be reduced to be small, and the number of components can be decreased.

DETAILED DESCRIPTION OF THE PREFERRED EMBODIMENT

A best mode for carrying out the present invention will be described hereinafter on the basis of the accompanying drawings.

Note that "a front (Fr)", "a rear (Rr)", "a left (L)" and "a right (R)" shown in the drawings are set based on an operation section 28 side of an engine-driven working machine 10 as the front (Fr).

Here, in an embodiment, the engine-driven working machine 10 is illustrated as "a generator 10", but it is also possible to apply the engine-driven working machine 10 to the other working machines such as a mowing machine.

Embodiment

The engine-driven working machine (more specifically, the generator) 10 according to the embodiment will be described.

Figure 1:
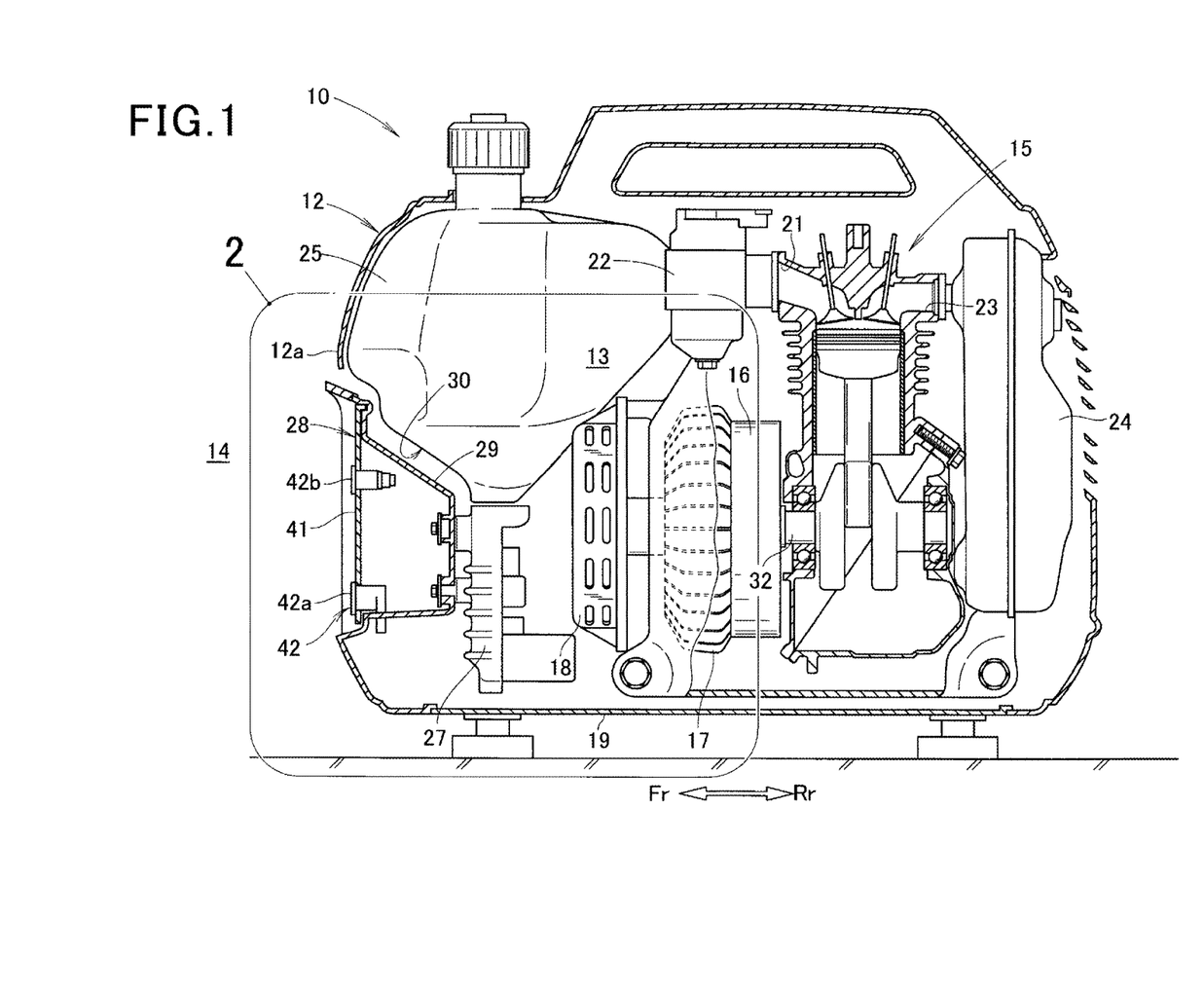
FIG. 1 is a sectional view illustrating an engine-driven working machine according to the present invention.

As illustrated in FIG. 1, the generator 10 includes an outer case 12 that forms an outer frame of the generator 10, an engine 15 that is housed in an inside 13 of the outer case 12, a power generating unit (a working unit) 16 that is provided at a front side of the engine 15, a cooling fan 17 that is provided at a front side of the power generating unit 16, and a recoil starter 18 that is provided at a front side of the cooling fan 17.

Further, the generator 10 includes a carburetor 22 that connects to an intake port 21 of the engine 15, a muffler 24 that connects to an exhaust port 23 of the engine 15, a fuel tank 25 that is disposed in front of the engine 15, an inverter 27 that is provided under the fuel tank 25, an operation section 28 that is provided on a case front wall 12a of the outer case 12, an operation cover (cover) 29 that covers equipment 42 of the operation section 28, and outside air introduction means 30 that guides outside air to the inside 13 from an outside 14 of the outer case 12.

That is, the engine 15, the power generating unit 16, the cooling fan 17, and the recoil starter 18 are housed in the inside 13 of the outer case 12. Further, the carburetor 22, the muffler 24, the fuel tank 25, the inverter 27 and the operation cover 29 are housed in the inside 13 of the outer case 12.

According to the generator 10, the engine 15 drives by manually turning the recoil starter 18. The engine 15 drives, and thereby, a crankshaft 32 rotates. A rotor of the power generating unit 16 is connected to the crankshaft 32. Consequently, the rotor of the power generating unit 16 rotates by the crankshaft 32 rotating, and the power generating unit 16 drives.

The power generating unit 16 drives, whereby an electromotive force is generated in the rotor and a stator, and power generation is performed in the power generating unit 16. Direct-current power that is generated in the power generating unit 16 is converted into alternating-current power in the inverter 27, and power is supplied to an outside from a connector 42a at the operation section 28.

Further, the cooling fan 17 is connected to the rotor of the power generating unit 16. Thereby, the cooling fan 17 rotates by the rotor of the power generating unit 16 rotating. The cooling fan 17 rotates, whereby outside air is sucked into the inside 13 from the outside 14 of the outer case 12 with the outside air introduction means 30.

The sucked outside air is fed to the fuel tank 25, the inverter 27, the engine 15 and the muffler 24 in sequence as cooling air. Thereby, the fuel tank 25, the inverter 27, the engine 15 and the muffler 24 can be cooled with the cooling air.

Figure 2:
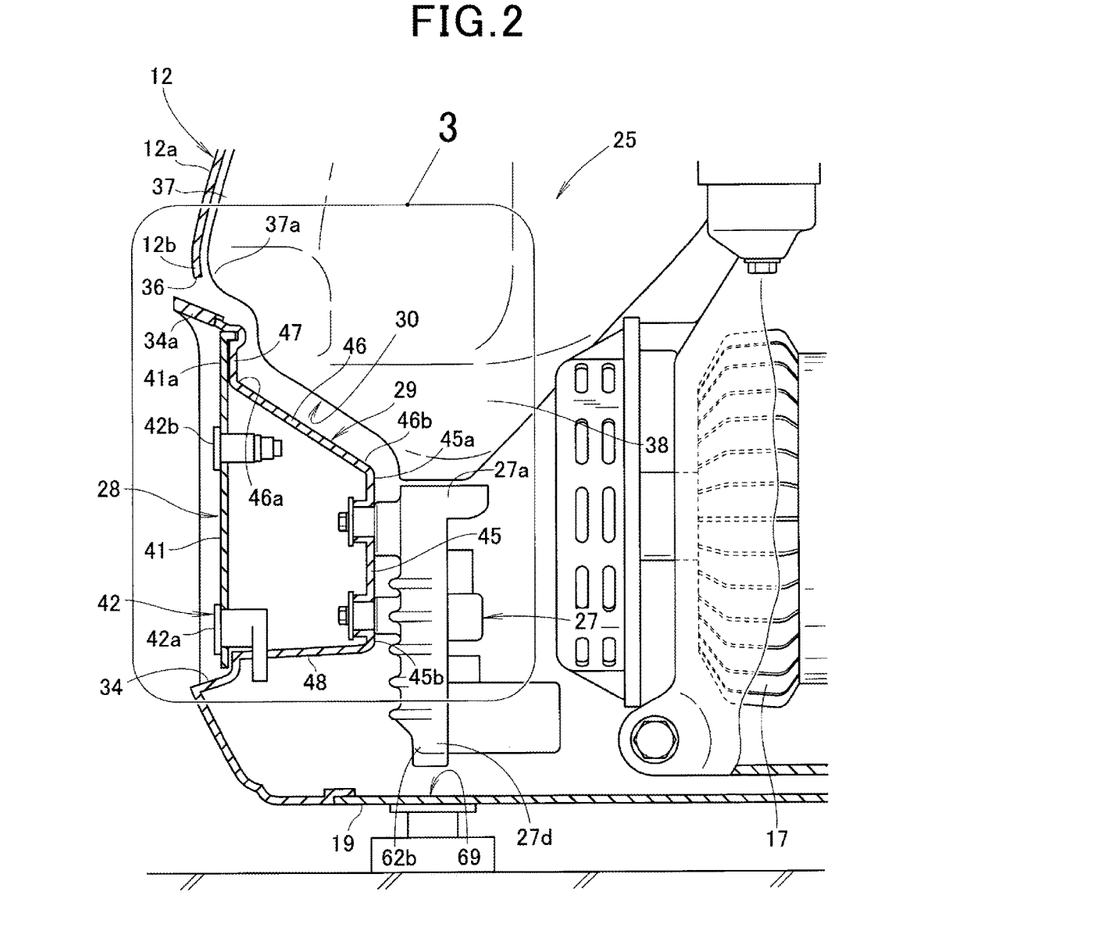
FIG. 2 is an enlarged view of part 2 in FIG. 1.

As illustrated in FIG. 2, a case concave portion 34 is formed in the case front wall 12a of the outer case 12, and the operation section 28 is mounted to the case concave portion 34. Further, an intake port 36 is formed in a site of an upper end portion 34a of the case concave portion 34, in the case front wall 12a at an upper side.

More specifically, the intake port 36 is disposed between the upper end portion 34a of the case concave portion 34 and a lower end 37a of a tank front wall (a wall portion) 37. The tank front wall 37 is a wall portion that forms a front wall of the fuel tank 25. In other words, the intake port 36 is formed in a lower side part 12b of the tank front wall 37, in the case front wall 12a.

The intake port 36 is an opening that extends in a lateral direction along an upper side of the operation section 28 and is formed into a substantially rectangular shape, as one example.

The operation section 28 is disposed under the intake port 36, and under a tank bottom portion 38 (described later) of the fuel tank 25. The operation section 28 includes an operation panel 41 that is mounted to the case concave portion 34, and the equipment 42 such as a connector 42a, and a switch (for example, an eco-throttle switch) 42b that are provided on the operation panel 41.

By the connector 42a, the alternating-current power that is converted in the inverter 27 is guided to the outside.

Further, the equipment 42 is covered with the operation cover 29. The operation cover 29 has a cover rear wall 45 that is disposed behind the operation panel 41, a cover top portion (a top portion) 46 that extends toward the operation panel 41 from an upper end 45a of the cover rear wall 45, a cover upper front portion 47 that is raised upward from an upper end 46a of the cover top portion 46, and a cover bottom portion 48 that extends toward the operation panel 41 from a lower end 45b of the cover rear wall 45.

The cover top portion 46 is extended in an inclined shape with a rising gradient toward the upper end portion 41a of the operation panel 41 from the upper end 45a of the cover rear wall 45. A lower end portion 46b of the cover top portion 46 is disposed at a substantially same height as an upper end portion 27a of the inverter 27.

Figure 3:
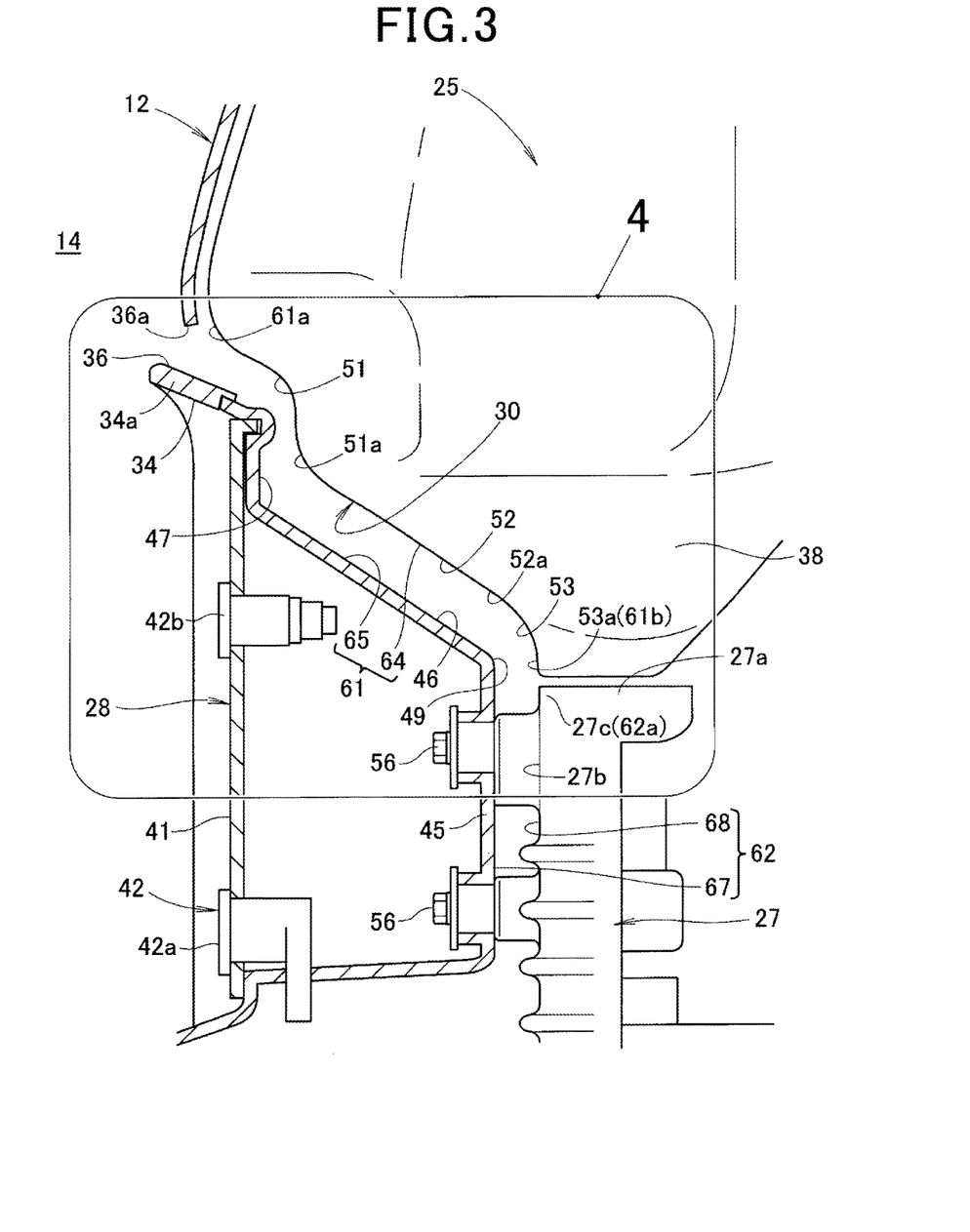
FIG. 3 is an enlarged view of part 3 in FIG. 2.

As illustrated in FIG. 3, the tank bottom portion (the bottom portion) 38 of the fuel tank 25 is disposed over the cover top portion 46 and the inverter 27. The tank bottom portion 38 has a first tank bend portion 51 that is disposed behind the upper edge 36a of the intake port 36, a tank inclined portion 52 that is disposed along the cover top portion 46 from a lower end 51a of the first tank bend portion 51, and a second tank bend portion (bend portion) 53 that is connected to a lower end 52a of the tank inclined portion 52.

The first tank bend portion 51 is formed into a concave shape toward an upper rear side along the upper end portion 34a of the case concave portion 34 and the cover upper front portion 47. Further, the first tank bend portion 51 is disposed at an upper rear side along the upper end portion 34a of the case concave portion 34 and the cover upper front portion 47 with a space left from the upper end portion 34a and the cover upper front portion 47.

The tank inclined portion 52 is integrally connected to the lower end 51a of the first tank bend portion 51.

The tank inclined portion 52 is inclined with a falling gradient toward the upper end portion 27a of the inverter 27 from the lower end 51a of the first tank bend portion 51, and is disposed over the cover top portion 46 with a space left with respect to the cover top portion 46. In other words, the cover top portion 46 is disposed in an inclined shape with a space left with respect to the tank inclined portion 52.

The second tank bend portion 53 is integrally connected to the lower end 52a of the tank inclined portion 52.

The second tank bend portion 53 extends in a bent shape from the lower end 52a of the tank inclined portion 52 to an upper end 27c of a radiating surface 27b of the inverter 27. More specifically, the second tank bend portion 53 is formed into a bent shape to be recessed to an upper rear side along an intersection portion 49 of the cover top portion 46 and the cover rear wall 45, with a space left with respect to the intersection portion 49.

The inverter 27 is provided under the second tank bend portion 53 and in front of (that is, at a suction side of the cooling fan 17) the cooling fan 17 (refer to FIG. 2).

The inverter 27 is mounted to the cover rear wall 45 of the operation cover 29 with bolts 56. In this state, the radiating surface 27b of the inverter 27 is disposed in a state where the radiating surface 27b of the inverter 27 faces the cover rear wall 45, and is raised substantially vertically with a space left with respect to the cover rear wall 45.

In this state, as illustrated in FIG. 2, a space is formed between a lower end 27d of the inverter 27 and an undercover 19 of the outer case 12.

Figure 4:
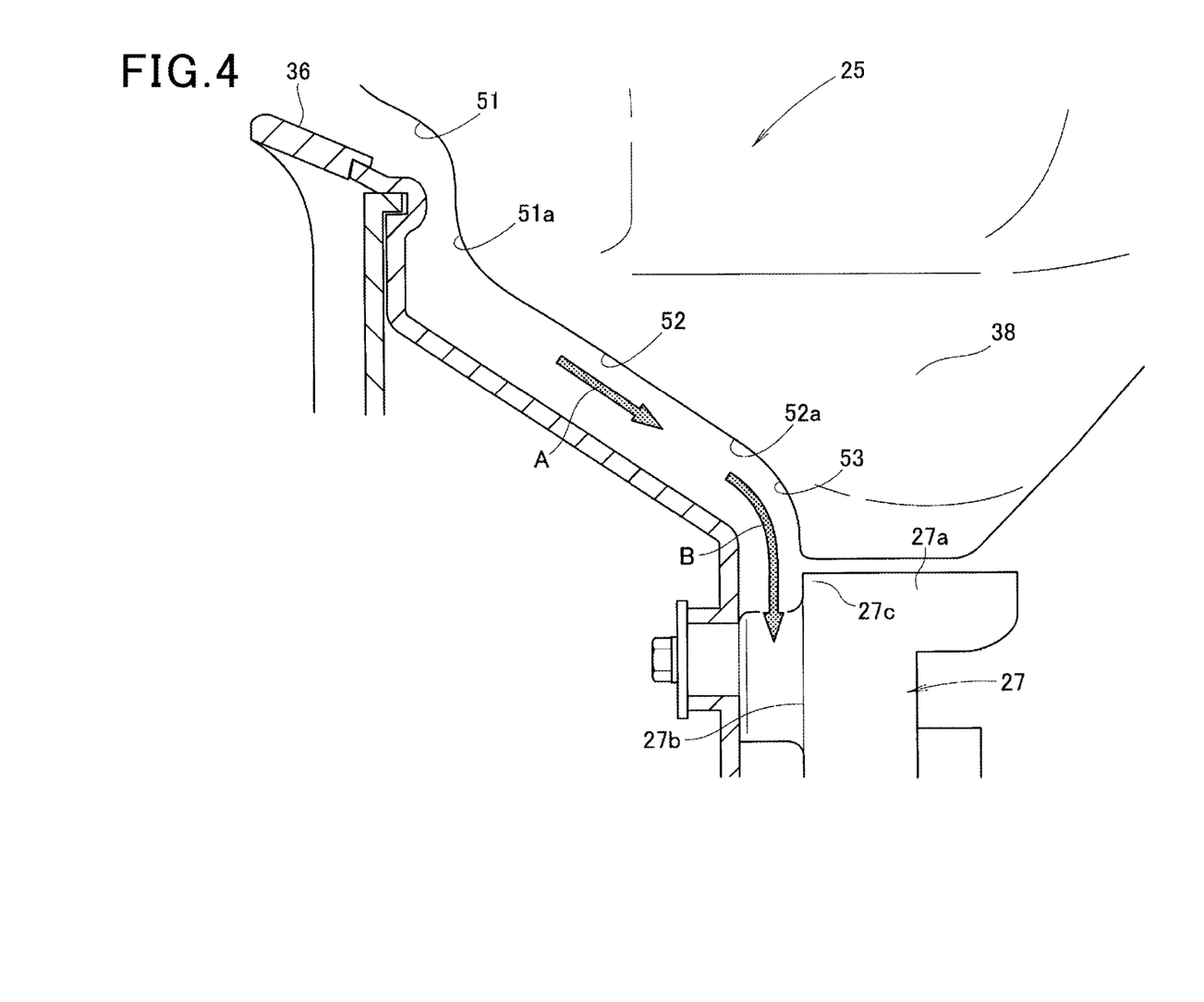
FIG. 4 is an enlarged view of part 4 in FIG. 3.

Here, as illustrated in FIG. 4, the tank inclined portion 52 is inclined with a falling gradient toward the upper end portion 27a of the inverter 27 from the lower end 51a of the first tank bend portion 51. Consequently, cooling air is guided along the tank inclined portion 52 like an arrow A.

Meanwhile, the radiating surface 27b of the inverter 27 is disposed in a state where the radiating surface 27b is raised substantially vertically.

Consequently, means that smoothly guides the cooling air which is guided along the tank inclined portion 52 like the arrow A, toward the radiating surface 27b of the inverter 27 is needed. Thus, the second tank bend portion 53 is formed on the tank bottom portion 38 of the fuel tank 25, and the second tank bend portion 53 is extended into a bent shape to the upper end 27c of the radiating surface 27b of the inverter 27 from the lower end 52a of the tank inclined portion 52.

Consequently, the cooling air that is guided along the tank inclined portion 52 can be smoothly guided to the radiating surface 27b of the inverter 27 with the second tank bend portion 53. Thereby, the cooling air that is guided along the tank inclined portion 52 is smoothly (that is, efficiently) guided to the radiating surface 27b of the inverter 27 via the second tank bend portion 53 like an arrow B.

Furthermore, by forming the second tank bend portion 53 on the tank bottom portion 38 of the fuel tank 25, the second bend portion 53 does not have to be formed by an exclusive member (that is, a shroud). Thereby, the number of components can be decreased.

Returning to FIG. 3, the outside air introduction means 30 includes the intake port 36 that is formed in the case front wall 12a of the outer case 12, a first air guide passage (an air guide passage) 61 that communicates with the intake port 36, and a second air guide passage 62 that communicates with the first air guide passage 61.

The first air guide passage 61 has an upper passage wall 64 that is formed of the first tank bend portion 51, the tank inclined portion 52 and the second tank bend portion 53, and a lower passage wall 65 that is formed by the upper end portion 34a of the case concave portion 34, the cover upper front portion 47 and the cover top portion 46.

That is, a main part of the first air guide passage 61 is formed by the tank bottom portion 38 and the cover top portion 46. Further, a lower portion of the upper passage wall 64 is formed by the second tank bend portion 53.

Furthermore, an upper end portion 61a of the first air guide passage 61 communicates with the intake port 36. The intake port 36 is opened to the outside 14 of the outer case 12. Consequently, outside air in the outside 14 of the outer case 12 is guided to the first air guide passage 61 through the intake port 36 as the cooling air.

Further, the upper passage wall 64 of the first air guide passage 61 is formed by the tank bottom portion 38. Thereby, the tank bottom portion 38 (more specifically, the fuel in the fuel tank 25) can be favorably cooled with the cooling air that is guided to the first air guide passage 61.

Here, a lower end portion 53a of the second tank bend portion 53 is made adjacent to the upper end 27c of the radiating surface 27b of the inverter 27, and is disposed on a substantially same plane as the upper end 27c. Further, a lower end portion 61b of the first air guide passage 61 communicates with an upper end portion 62a of the second air guide passage 62.

Consequently, the cooling air that is guided to the first air guide passage 61 is efficiently guided to the radiating surface 27b of the inverter 27 and the upper end portion 62a of the second air guide passage 62 with the second tank bend portion 53.

The second air guide passage 62 has a front passage wall 67 that is formed by the cover rear wall 45, and a rear passage wall 68 that is formed by the radiating surface 27b of the inverter 27. That is, the second air guide passage 62 that extends in the vertical direction is formed by the cover rear wall 45 and the radiating surface 27b of the inverter 27.

A lower end portion 62b of the second air guide passage 62 communicates with a space 69 between a lower end 27d of the inverter 27 and the undercover 19, as illustrated in FIG. 2.

Consequently, as illustrated in FIG. 3, the cooling air that is guided to the upper end portion 62a of the second air guide passage 62 is efficiently guided to the lower end 27d (refer to FIG. 2) of the radiating surface 27b along the second air guide passage 62 (that is, the radiating surface 27b of the inverter 27). Thereby, the radiating surface 27b (that is, the inverter 27) of the inverter 27 can be favorably cooled.

Further, the second tank bend portion 53 is included in a lower portion of the first air guide passage 61. Consequently, the cooling air can be guided to the radiating surface 27b of the inverter 27 with the second tank bend portion 53. Thereby, the cooling air can be efficiently guided to the radiating surface 27b of the inverter 27, and the inverter 27 can be cooled more favorably.

In this way, the cooling air that is guided from the intake port 36 can be efficiently guided to the tank bottom portion 38 and the radiating surface 27b of the inverter 27. Consequently, by forming the single intake port 36 in the case front wall 12a, both the members of the fuel tank 25 and the inverter 27 can be cooled.

Thereby, the opening in the case front wall 12a can be reduced to be small, and noise of the generator 10 can be reduced.

Further, the tank bottom portion 38, the cover top portion 46 and the like are also used as the members that form the first air guide passage 61. Furthermore, the radiating surface 27b of the inverter 27 and the cover rear wall 45 are also used as the members that form the second air guide passage 62.

Thereby, there is no need to include an exclusive member (that is, a shroud) in order to form the first air guide passage 61 and the second air guide passage 62, and the number of components can be decreased.

Next, an example of cooling the fuel tank 25 and the inverter 27 in the engine-driven working machine 10 according to the present invention will be described based on FIG. 5.

Figure 5:
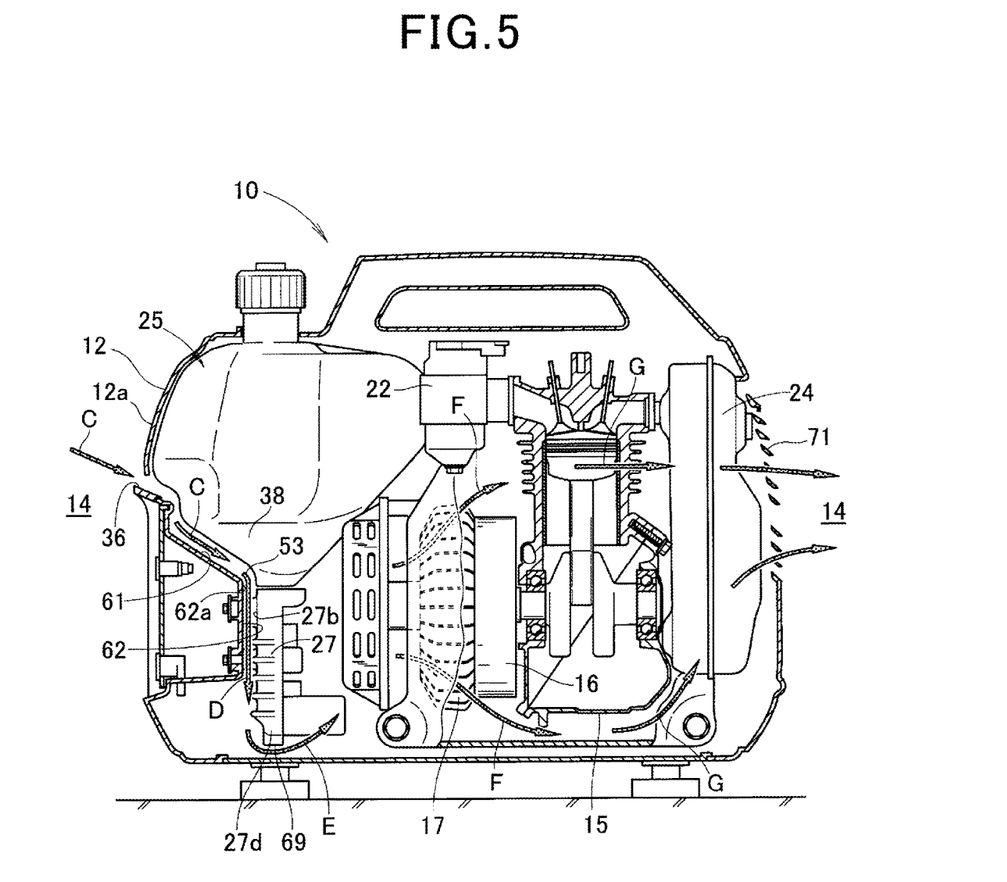
FIG. 5 is a view illustrating an example of cooling a fuel tank and an inverter in the engine-driven working machine according to the present invention.

As illustrated in FIG. 5, the engine 15 drives and the cooling fan 17 rotates. The cooling fan 17 rotates, whereby outside air of the outside 14 is guided to the first air guide passage 61 through the intake port 36 as the cooling air like an arrow C.

The tank bottom portion 38 (more specifically, the fuel in the fuel tank 25) can be favorably cooled with the cooling air that is guided to the first air guide passage 61.

Further, the cooling air that is guided to the first air guide passage 61 is efficiently guided toward the radiating surface 27b of the inverter 27 and the upper end portion 62a of the second air guide passage 62 with the second tank bend portion 53. The cooling air that is guided is efficiently guided like an arrow D to the lower end 27d of the radiating surface 27b along the second air guide passage 62 (that is, the radiating surface 27b of the inverter 27).

The radiating surface 27b (that is, the inverter 27) of the inverter 27 can be favorably cooled with the cooling air that is guided to the second air guide passage 62.

By efficiently guiding the cooling air to the tank bottom portion 38 and the radiating surface 27b of the inverter 27 in this way, both members of the fuel tank 25 and the inverter 27 can be cooled by only forming the single intake port 36 in the case front wall 12a.

The cooling air that is guided to the lower end 27d of the radiating surface 27b is guided (sucked) like an arrow E toward the cooling fan 17 through the space 69. The cooling air that is sucked to the cooling fan 17 is sent like an arrow F toward the engine 15 from the cooling fan 17. The power generating unit 16 can be cooled with the cooling air that is sent.

The cooling air that cools the power generating unit 16 is guided like an arrow G along the engine 15. The engine 15 can be cooled with the cooling air that is guided. The muffler 24 is cooled with the cooling air that cools the engine 15. The cooling air that cools the muffler 24 is discharged to the outside 14 from a louver 71 of the outer case 12.

Note that the engine-driven working machine according to the present invention is not limited to the aforementioned embodiment, and can be properly modified, and altered.

For example, in the aforementioned embodiment, the example in which the first air guide passage 61 is formed by the tank bottom portion 38 and the operation cover 29 is described, but the present invention is not limited to this. It is also possible to form the first air guide passage 61 by only the tank bottom portion 38 of the fuel tank 25, for example.

In this case, the fuel tank 25 can be also favorably cooled with the cooling air, and the inverter 27 can be also further cooled favorably, as in the embodiment.

Further, in the aforementioned embodiment, the example in which the second air guide passage 62 is formed by the radiating surface 27b of the inverter 27 and the operation cover 29 is described, but the present invention is not limited to this. It is also possible to form the second air guide passage 62 by only the radiating surface 27b of the inverter 27, for example.

In this case, the inverter 27 can be also favorably cooled, as in the embodiment.

Furthermore, the shapes and the configurations of the generator, the outer case, cooling fan, the fuel tank, the inverter, the operation section, the operation cover, the intake port, the tank front wall, the tank bottom portion, the equipment, the cover top portion, the second tank bend portion, the first air guide passage and the like are not limited to the shapes and the configurations that are illustrated, but can be properly changed.

The present invention is suitable for application to the engine-driven working machine in which the cooling fan and the inverter are provided in the inside of the outer case, and the fuel tank is provided over the inverter.

REFERENCE SIGNS LIST

10 Generator (engine-driven working machine)
12 Outer case
12b Lower side part
13 Inside of outer case
17 Cooling fan
25 Fuel tank
27 Inverter
28 Operation section
29 Operation cover (cover)
36 Intake port
37 Tank front wall (wall portion)
38 Tank bottom portion (bottom portion)
42 Equipment
46 Cover top portion (top portion)
53 Second tank bend portion (bend portion)
61 First air guide passage (air guide passage)

What is claimed is:

1. An engine-driven working machine in which a cooling fan is provided in an inside of an outer case, an inverter is provided at a suction side of the cooling fan, and a fuel tank is provided over the inverter, comprising:
   an intake port that is formed in a lower side part of a wall portion of the fuel tank, in the outer case; and
   a first air guide passage that is formed by a bottom portion of the fuel tank, the bottom portion of the fuel tank inclining with a falling gradient toward the inverter from the intake port, the engine-driven working machine further comprises:
   an operation section that is provided under the bottom portion and that includes an operation panel and equipment provided on the operation panel; and
   a cover that covers the equipment,
   the cover has a cover rear wall that is disposed behind the operation panel and a cover top portion that extends toward the operation panel from an upper end of the cover rear wall,
   the cover top portion is disposed with a space left with respect to the bottom portion,
   the inverter is disposed in a state where a radiating surface of the inverter faces the cover rear wall and the radiating surface is disposed with a space left with respect to the cover rear wall,
   the first air guide passage comprises the bottom portion of the fuel tank and the cover top portion and a second air guide passage that communicates with the first air guide passage comprises the cover rear wall and the radiating surface of the inverter.

2. The engine-driven working machine according to claim 1,
   wherein the fuel tank has
   a bend portion that is provided at the bottom portion of the fuel tank to form a part of the air guide passage, and guides cooling air that is guided to the air guide passage toward the inverter.

3. The engine-driven working machine according to claim 1,
   wherein the cover top portion of the cover is disposed in an inclined shape with a space left with respect to the bottom portion, and the air guide passage is formed by the bottom portion and the top portion.

4. The engine-driven working machine according to claim 2,
wherein the cover top portion of the cover is disposed in an inclined shape with a space left with respect to the bottom portion, and
the air guide passage is formed by the bottom portion and the top portion.

* * * * *